US012269677B2

(12) United States Patent
Fourniotis et al.

(10) Patent No.: US 12,269,677 B2
(45) Date of Patent: Apr. 8, 2025

(54) SAFETY PAIL

(71) Applicants: Spiro Fourniotis, Bayside, NY (US); Steven Martin Cohen, New York, NY (US)

(72) Inventors: Spiro Fourniotis, Bayside, NY (US); Steven Martin Cohen, New York, NY (US)

( * ) Notice: Subject to any disclaimer, the term of this patent is extended or adjusted under 35 U.S.C. 154(b) by 90 days.

(21) Appl. No.: 18/056,654

(22) Filed: Nov. 17, 2022

(65) Prior Publication Data

US 2023/0150762 A1 May 18, 2023

Related U.S. Application Data

(60) Provisional application No. 63/280,612, filed on Nov. 17, 2021.

(51) Int. Cl.
*B65F 1/06* (2006.01)

(52) U.S. Cl.
CPC ........ *B65F 1/068* (2013.01); *B65F 2220/101* (2013.01)

(58) Field of Classification Search
CPC ....... B65F 1/068; B65F 2220/101; B65F 1/12
USPC ... 220/7, 4.11, 4.08, 4.09, 601, 600, 495.06, 220/4.01, 4.07, 4.04, 617
See application file for complete search history.

(56) References Cited

U.S. PATENT DOCUMENTS 1,157,008 A * 10/1915 Lang ........................ B65F 1/068 220/908
1,500,917 A * 7/1924 Bell ......................... B65D 7/24 47/66.1
3,063,591 A 11/1962 Laginestra
3,966,072 A * 6/1976 Gonzales ............... B65D 19/12 220/7
5,361,978 A 11/1994 Monroe
5,381,921 A 1/1995 Bray et al.
5,901,872 A 5/1999 Zollinhofer et al.
6,179,151 B1 1/2001 Radvansky et al.
6,234,339 B1 5/2001 Thomas
6,283,321 B1 9/2001 Meshorer
6,299,010 B1 * 10/2001 Hsu ........................... B65F 1/02 220/4.08
6,339,944 B1 1/2002 Skalka
6,732,880 B1 5/2004 Nash, Sr.
8,820,568 B1 9/2014 Antos
D733,987 S 7/2015 Coffin
9,745,128 B2 8/2017 Romano et al.
(Continued)

FOREIGN PATENT DOCUMENTS

FR 3 019 161 3/2014

*Primary Examiner* — Chun Hoi Cheung
(74) *Attorney, Agent, or Firm* — LaMorte & Associates P.C.

(57) ABSTRACT

A trash receptacle assembly that is made from two sections that can be selectively connected and/or separated. The first section has a base. An incomplete peripheral wall extends upwardly from the base. The incomplete peripheral wall has a first side edge and a second side edge, wherein a gap is defined between the first side edge and the second side edge. Guide tracks are provided on the incomplete peripheral wall along at least part of the first side edge and the second side edge. A peripheral wall segment is provided that is shaped and sized to fill the gap in the incomplete peripheral wall. The peripheral wall segment slides into the guide tracks on the first section.

11 Claims, 6 Drawing Sheets

(56) References Cited

U.S. PATENT DOCUMENTS

| | | | |
|---|---|---|---|
| 9,944,460 | B2 | 4/2018 | Hon |
| 10,604,341 | B2 | 3/2020 | Walker |
| 2003/0006237 | A1 | 1/2003 | Passantino et al. |
| 2005/0224496 | A1 | 10/2005 | Moyer |
| 2006/0283852 | A1 | 12/2006 | Greiner |
| 2008/0149647 | A1 | 6/2008 | Geurink et al. |
| 2013/0048641 | A1 | 2/2013 | Romano |
| 2014/0246439 | A1 | 9/2014 | Friedman |
| 2015/0274417 | A1 | 10/2015 | Feanny |

* cited by examiner

SAFETY PAIL

RELATED APPLICATIONS

This application claims the benefit of U.S. Provisional Patent Application No. 63/280,612, filed Nov. 17, 2021.

BACKGROUND OF THE INVENTION

1. Field of the Invention

In general, the present invention relates to the structure of garbage cans, trash pails and other trash receptacles. More particularly, the present invention relates to trash receptacles with side openings that make it easier to remove a full bag of trash from the trash receptacle.

2. Prior Art Description

Traditional trash receptacles are simple metal or plastic receptacles with an open top. The trash receptacle is often lined with a disposable trash bag. Once the trash bag is full, the trash bag is lifted out of the receptacle. This process requires lifting the full trash bag high enough to clear the top of the trash receptacle. The trash bag, depending on size and content, can be quite heavy. Lifting such a weight can be difficult for many people and can cause injury. In an attempt to reduce the effort needed to empty a full trash bag from a trash receptacle, doors have been added to the structure of the trash receptacle. The doors are located on the sides of the trash receptacle and provide easy access to the trash bag without having to lift the trash bag to any significant height. Such prior art trash receptacles are exemplified by U.S. Patent Application Publication No. 2008/0149647 to Geurink and U.S. Pat. No. 10,604,341 to Walker.

There are problems associated with trash receptacles that have attached doors. One problem is that the door opening is typically a little smaller than the interior of the trash receptacle. As is widely known, when a trash bag is filled with garbage, the trash bag stretches and conforms to the size of the trash receptacle. Furthermore, the full trash bag can have salient points and bulges that cause the full trash bag to press against the interior surfaces of the trash receptacle. This makes the full trash bag difficult to remove from the open top of a trash receptacle. This also can make the trash bag nearly impossible to remove through any opening, such as a side door opening, that is in any way smaller than the full trash bag.

Another problem associated with prior art trash receptacles that have access doors is that the doors need significant room to fully open. If the doors are not fully open, then the trash bags cannot be received. Often, the opening of the door on the trash receptacle doubles the size of the trash receptacle. Such prior art trash receptacles are exemplified by U.S. Pat. No. 9,944,460 to Hon and U.S. Pat. No. 6,732,880 to Nash. Other trash receptacles have front pivot doors that require the area in front of the trash receptacle be large and unoccupied. Such prior art trash receptacles are exemplified by U.S. Pat. No. 9,745,128 to Romano and U.S. Pat. No. 6,283,321 to Meshorer. In all cases, some area around the trash receptacle must be unoccupied or the trash receptacle must be pulled to an open area before it can be unloaded. This limits situations where such trash receptacles can be used.

A need therefore exists for an improved trash receptacle that can be unloaded from a side opening, but where there is no need to provide room for a swinging door. This need is met by the present invention as described and claimed below.

SUMMARY OF THE INVENTION

The present invention is a trash receptacle assembly that is made from two sections that can be selectively connected and/or separated. The first section has a base. An incomplete peripheral wall extends upwardly from the base. The incomplete peripheral wall has a first side edge, and a second side edge, wherein a gap is defined between the first side edge and the second side edge.

Guide tracks are provided on the incomplete peripheral wall along at least part of the first side edge and the second side edge.

The second section of the trash receptacle assembly contains a peripheral wall segment that is shaped and sized to fill the gap in the incomplete peripheral wall of the first section. The second section is completely separate and distinct from the first section. The peripheral wall segment has edges that can selectively slide into the guide tracks on the first section. The edges are received and retained by the guide tracks therein retaining the peripheral wall segment in the gap of the incomplete peripheral wall and completing the trash receptacle assembly.

The trash receptacle assembly is lined with a trash bag. Once the trash bag is full, the peripheral wall segment of the second section can be completely removed from the gap and detached from the first section. This provided access to the trash bag without requiring a swinging door.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention can be embodied in many ways, only two exemplary embodiments are illustrated. The exemplary embodiments are being shown for the purposes of explanation and description. The exemplary embodiments are selected in order to set forth two of the best modes contemplated for the invention. The illustrated embodiments, however, are merely exemplary and should not be considered as limitations when interpreting the scope of the appended claims.

Figure 1:
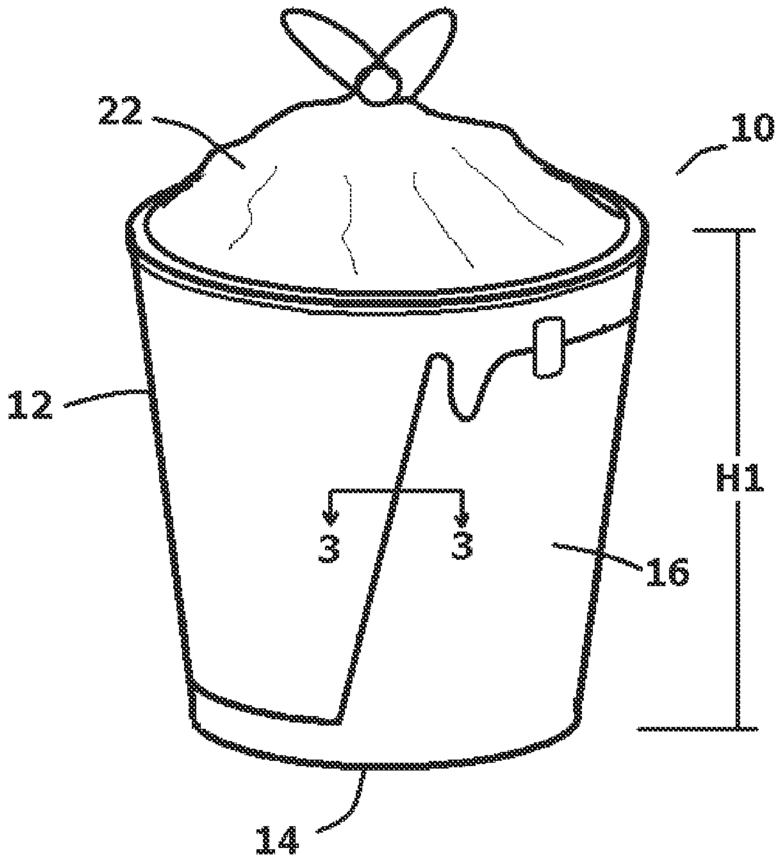
FIG. 1 shows a first exemplary embodiment of trash receptacle assembly.
Figure 2:
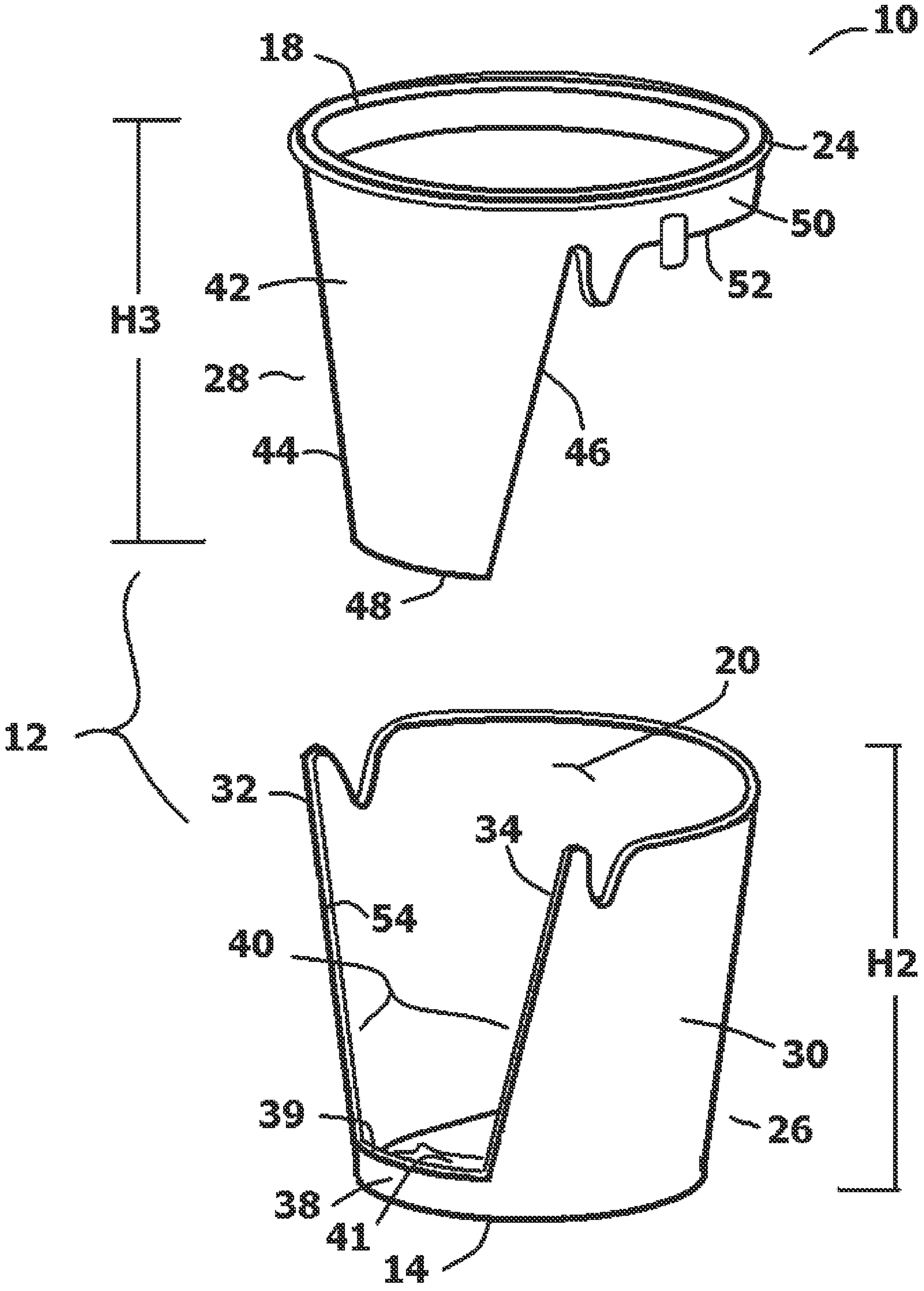
FIG. 2 shows an exploded view of the exemplary embodiment of FIG. 1.

Referring to FIG. 1 and FIG. 2, a safety pail system 10 is shown. The safety pail system 10 contains a receptacle assembly 12. The receptacle assembly 12 has a bottom panel 14 that can be solid, perforated, or mesh. A peripheral wall

16 extends from the bottom panel 14 to an open top rim 18. The peripheral wall 16 has a height H1. In the shown embodiment, the bottom panel 14 and the open top rim 18 are circular with the open top rim 18 having a larger diameter than does the bottom panel 14. This causes the peripheral wall 16 to flare and follow a diverging conical shape. However, it will be understood that the bottom panel 14 and the open top rim 18 can have different sizes and shapes, wherein the peripheral wall 16 will follow different paths from the bottom panel 14 to the open top rim 18.

The receptacle assembly 12 defines an open interior space 20 that is sized to receive a disposable trash bag 22. The open interior space 20 is normally only accessible through the open top rim 18. The open top rim 18 may contain a flared edge 24 to help receive and hold the disposable trash bag 22 open within the open interior space 20.

The receptacle assembly 12 is an assembly of two sections. The two sections include a lower section 26 and an upper section 28. The lower section 26 holds the bottom panel 14 of the safety pail system 10. The lower section 26 of the receptacle assembly 12 retains a first wall segment 30 of the peripheral wall 16. The first wall segment 30 has a height H2. Depending upon the style of the trash receptacle, the height H2 of the first wall segment can be any height up to the height H1 of the overall receptacle assembly 12. However, for the shown style, the first wall segment 30 has a height H2 that is preferably between seventy percent and ninety percent of the full height H1 of the full peripheral wall 16. The first wall segment 30 extends from a first edge 32 to a second edge 34. Furthermore, the first wall segment 30 has a top edge 36. The top edge 36 is contoured for a purpose that is later explained.

A short wall band 38 extends from the first edge 32 to the second edge 34 to provide structural stability. The short wall band 38 has an upper edge 39. A gap 40 exists above the short wall band 38 that is defined on three sides by the first edge 32 of the first wall segment 30, the upper edge 39 of the short wall band 38, and the second edge 34 of the first wall segment 30. The gap 40 is completely filled by the upper section 28 of the receptacle assembly 12 when the upper section 28 is assembled onto the lower section 26. The first edge 32, the second edge 34, the top edge 36, and the upper edge 39 all contain guide tracks 54 for a purpose that is later explained.

The bottom panel 14 rests at the bottom of the lower section 26. The bottom panel 14 can be flat. However, in a preferred embodiment, the bottom panel 14 can incline away from the short wall band 38. Furthermore, a trough 41 can be disposed in the bottom panel 14 near the short wall band 38. One or more drain openings can be provided at the bottom of the trough 41. The inclined bottom panel 14 serves two purposes. First, the inclination of the bottom surface tends to tilt the trash bag 22 toward the gap 40 when the trash bag 22 is full. Second, the inclined bottom panel 14 collects and channels any liquids that drip from the trash bag 22 to drain openings.

The upper section 28 of the receptacle assembly 12 holds the open top rim 18 of the safety pail system 10. The upper section 28 of the receptacle assembly 12 retains a second wall segment 42 of the peripheral wall 16. The second wall segment 42 has a height H3, which is preferably between seventy percent and ninety percent of the height H1 of the full peripheral wall 16. The second wall segment 42 extends from a third edge 44 to a fourth edge 46. Furthermore, the second wall segment 42 has a bottom edge 48. The bottom edge 48 is contoured for a purpose that is later explained. A second short wall band 50 extends from the third edge 44 to the fourth edge 46 to provide structural stability. The short wall band 50 has a lower edge 52. The third edge 44, the fourth edge 46, the bottom edge 48 and the lower edge 52 are all shaped to be received by the guide tracks 54 on the lower section 26 of the receptacle assembly 12.

Figure 3:
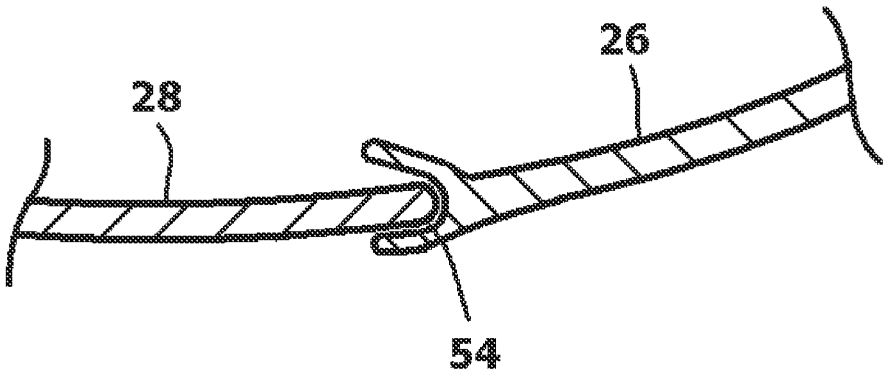
FIG. 3 is a fragmented view of section line 3-3 in FIG. 1, showing the guide track interconnection between the two sections of the trash receptacle assembly.

The upper section 28 of the receptacle assembly 12 and the lower section 26 of the receptacle assembly 12 interconnect to form the overall safety pail system 10. Referring to FIG. 3 in conjunction with FIG. 1 and FIG. 2, it can be seen that the first edge 32, the second edge 34, the top edge 36 and the upper edge 39 of the lower section 26 of the receptacle assembly 12 intermesh with the third edge 44, the fourth edge 46, the bottom edge 48 and the lower edge 52 of the upper section 28 of the receptacle assembly 12. In the shown embodiment, the first edge 32, the second edge 34, the top edge 36 and the upper edge 39 of the lower section 26 of the receptacle assembly 12 all contain guide tracks 54. The third edge 44, the fourth edge 46, the bottom edge 48, and the lower edge 52 of the upper section 28 of the receptacle assembly 12 are all tapered to be better received within the guide tracks 54. Such a male/female configuration can be reversed, and it will be understood that the guide tracks 54 can be formed on the upper section 28 rather than on the illustrated lower section 26. The guide tracks 54 can be generally U-shaped. However, in FIG. 3, the guide track 54 is shown to be generally Y-shaped. This helps the lower section 26 and the upper section 28 interconnect even if the two sections are not precisely aligned.

Figure 4:
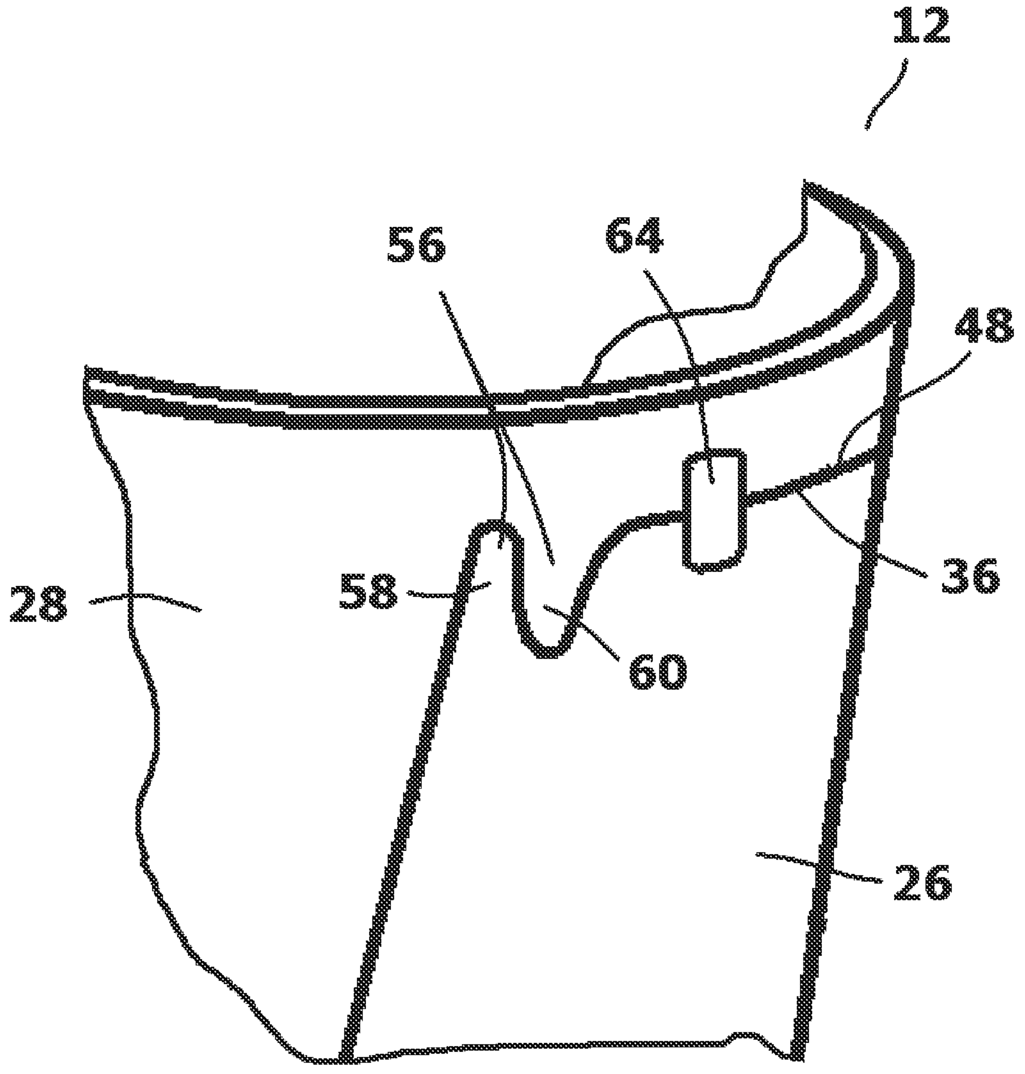
FIG. 4 is an enlarged fragmented view of the embodiment of FIG. 2 to show interconnecting features.

The upper section 28 of the receptacle assembly 12 interconnects with the lower section 26 of the receptacle assembly 12 to form the overall safety pail system 10. Referring to FIG. 4, in conjunction with FIG. 1 and FIG. 2, it will be understood that features 56 can be formed into the top edge 36 of the lower section 26 and the bottom edge 48 of the upper section 28 that prevent the upper section 28 and the lower section 26 from inadvertently separating. In the illustrated embodiment, the features 56 include corresponding peaks 58 and troughs 60 that can be formed in both the top edge 36 of the lower section 26 and the bottom edge 48 of the upper section 28. The peaks 58 and troughs 60 intermesh to prevent any inadvertent lateral separation between the upper section 28 and the lower section 26 of the receptacle assembly 12. Since the guide tracks 54 may be present in the lower section 26, a drain opening can be provided in the lowest point of any trough 60 to prevent any fluid from pooling in the bottom of the trough 60.

To further prevent inadvertent separation between the upper section 25 and the lower section 26, a mechanical latch 64 can be provided that mechanically interconnects the upper section 28 to the lower section 26. The mechanical latch 64 can be any latch or hasp that can be manually closed and opened, wherein the latch or hasp acts to bind the upper section 28 and the lower section 26 together when closed.

Returning to FIG. 1 and FIG. 2, it will be understood that the upper section 28 of the receptacle assembly 12 is interconnected with the lower section 26 of the receptacle assembly 12 to complete the safety pail system 10. A disposable trash bag 22 is placed into the receptacle assembly 12 through the open top rim 18. When the trash bag 22 is full, the trash bag 22 is tied closed. Any mechanical latch 64 present is manually undone. The upper section 28 of the receptacle assembly 12 is then lifted away from the lower section 26 of the receptacle assembly 12. This exposes the large gap 40 between the first edge 32 and the second edge 34 of the first wall segment 30. The full trash bag 22 is then easily removed from the lower section 26 of the receptacle assembly 12. Once the full trash bag 22 is removed, the upper section 28 is replaced and a new trash bag added. The safety pail system 10 is then ready for reuse.

Figure 5:
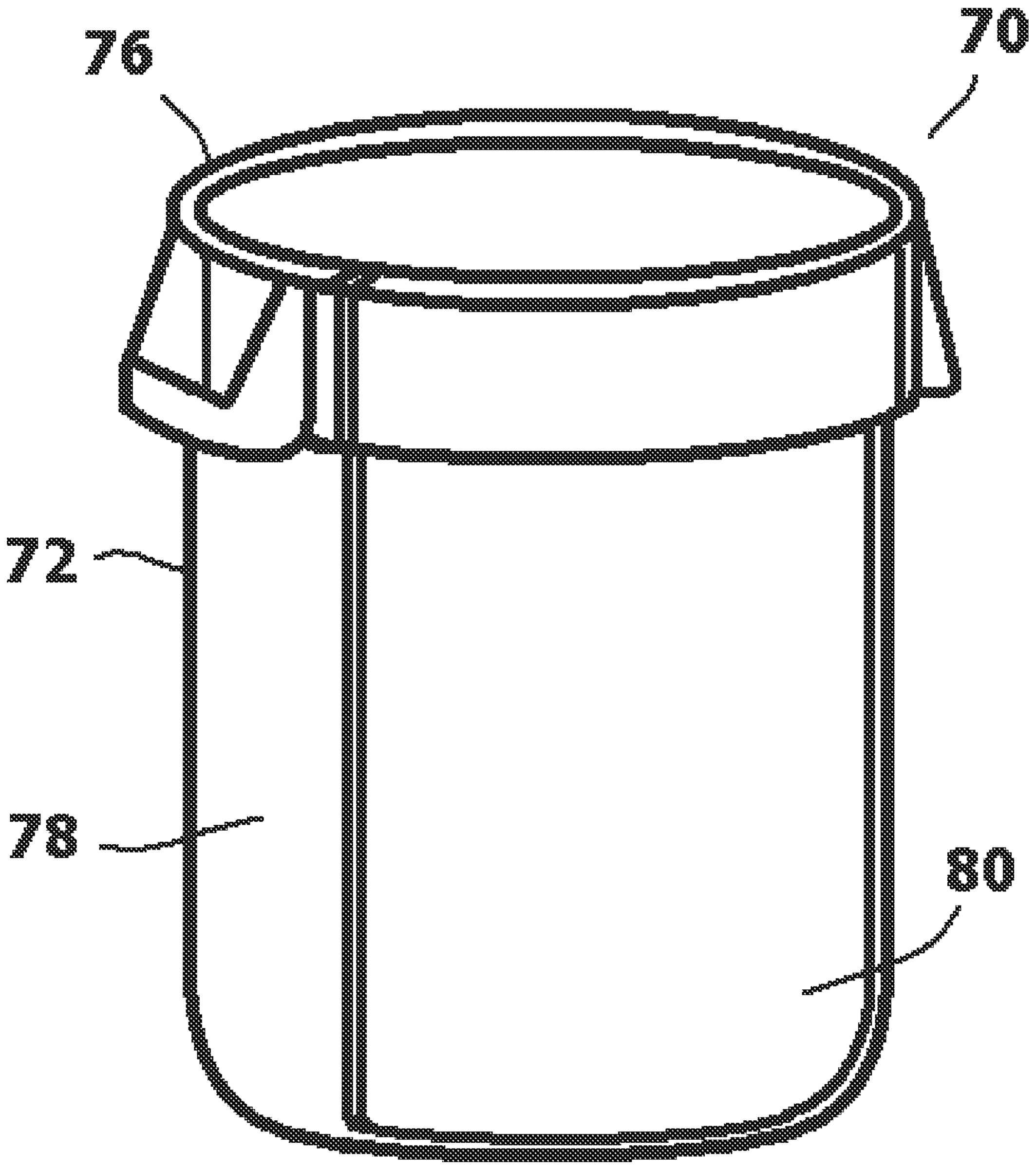
FIG. 5 shows a second exemplary embodiment of a trash receptacle assembly.
Figure 6:
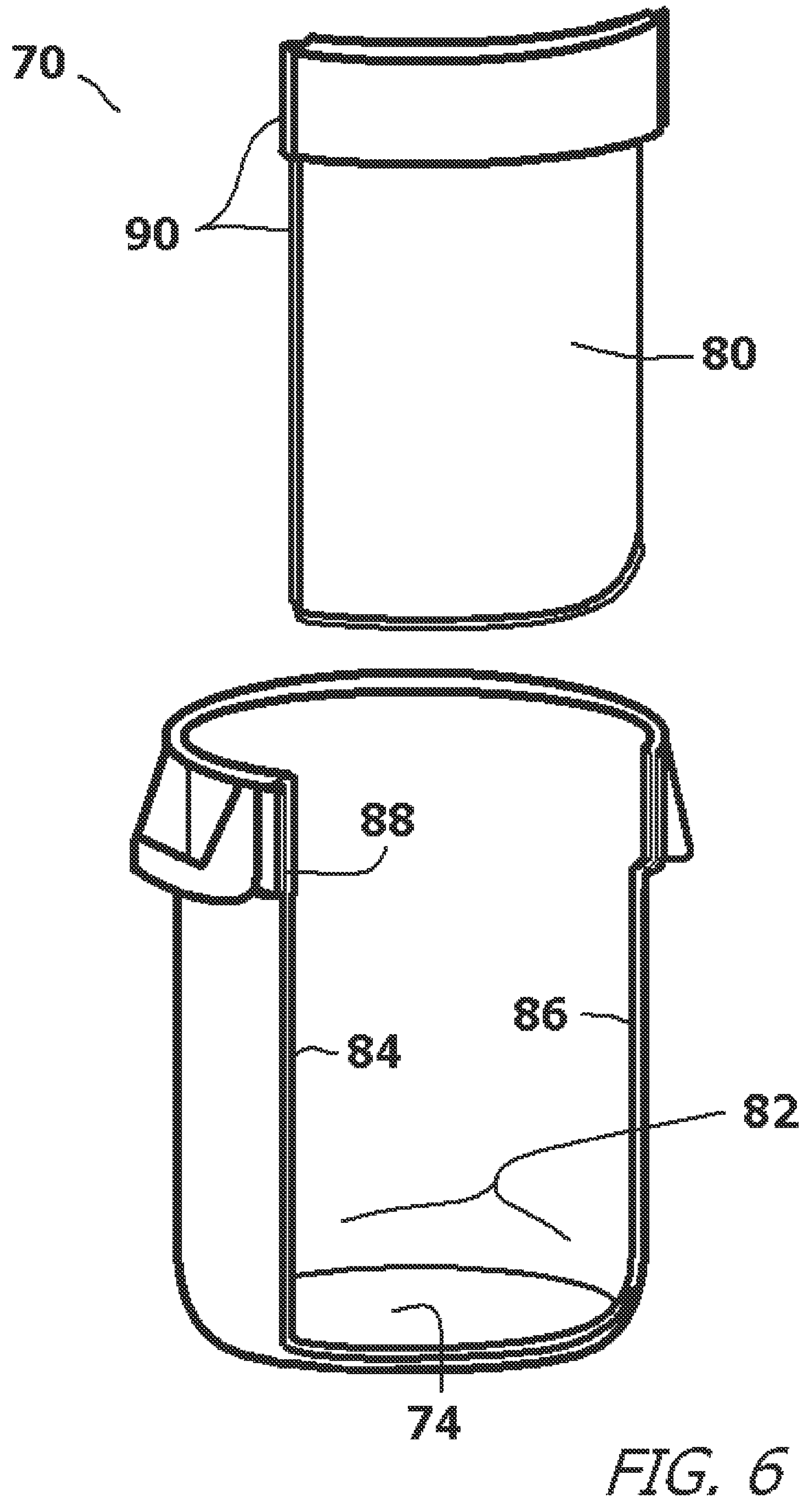
FIG. 6 shows an exploded view of the exemplary embodiment of FIG. 5.

Referring to FIG. 5 and FIG. 6, an alternate embodiment of a safety pail assembly 70 is shown. In this embodiment, a large receptacle assembly 72 is shown. This receptacle assembly 72 has a bottom surface 74, an open top rim 76 and a peripheral wall 78 that extends between the bottom surface 74 and the open top rim 76. The peripheral wall 78 has a complex shape and flares wide near the open top rim 76.

A section 80 of the peripheral wall 78 is removable. Once removed, a gap 82 exists in the peripheral wall 78 that extends between a first wall edge 84 and a second wall edge 86. The gap 82 exists from the open top rim 76 to the bottom surface 74.

U-shaped guide tracks 88 are provided along sections of the first wall edge 84 and the second wall edge 86. The guide tracks 88 can also extend along the bottom surface 74. The guide tracks 88 are shaped and sized to receive the removable section 80 of the peripheral wall 78. The removable section 80 of the peripheral wall 78 has edges 90 that are shaped and sized to be received within the guide tracks 88. When the removable section 80 of the peripheral wall 78 engages the guide tracks 88 on the first wall edge 84 and the second wall edge 86, the removable section 80 completely fills the gap 82 and completes the receptacle assembly 70. Once in place, the removable section 80 of the peripheral wall 78 resists all movement except movement upward in the vertical direction. To prevent inadvertent movement in the vertical direction, manual latches can be provided to temporarily lock the removable section 80 of the peripheral wall 78 in place.

It will be understood that once the removable section 80 is set in place, a disposable trash bag is placed into the receptacle assembly 72 through the open top rim 76. When the trash bag is full, the trash bag is tied closed. Any mechanical latch present is manually undone. The removable section 80 of the receptacle assembly 72 is then lifted away. This exposes the large gap 82 between the first wall edge 84 and the second wall edge 86. The full trash bag is then easily removed from the receptacle assembly 72. Once the full trash bag is removed, the removable section 80 is replaced, and a new trash bag added. The overall safety pail system 70 is then ready for reuse.

It will be understood that the embodiments of the present invention that are illustrated and described are merely exemplary and that a person skilled in the art can make many variations to those embodiments. All such embodiments are intended to be included within the scope of the present invention as defined by the appended claims.

What is claimed is:

1. A trash receptacle assembly comprising, a first section having a base and an incomplete peripheral wall that extends upwardly from said base, wherein said incomplete peripheral wall has a top edge, a first side edge, a second side edge, wherein said top edge has a gap formed therein that extends between said first side edge and said second side edge;

guide tracks formed along at least part of said first side edge and said second side edge;

a second section containing a peripheral wall segment with a third side edge, a fourth side edge, and a wall band that extends from said third side edge to said fourth side edge, wherein said wall band has a lower edge, wherein said peripheral wall segment is shaped and sized to fill said gap in said incomplete peripheral wall with said lower edge of said wall band contacting and covering said top edge of said incomplete peripheral wall, wherein said second section is completely separate and distinct from said first section, and wherein said second section can selectively slide into said guide tracks and is received and retained by said guide tracks therein retaining said second section in said gap.

2. The trash receptacle assembly according to claim 1, further including mechanical latches for selectively locking said second section in said gap.

3. The trash receptacle assembly according to claim 1, wherein said lower edge of said band and said top edge of said incomplete peripheral wall follow contoured paths with peaks and troughs at points along said paths that interlock when said second section is in said guide tracks and fills said gap in said first section.

4. The trash receptacle assembly according to claim 1, wherein said trash receptacle assembly has a first height and said incomplete peripheral wall has a second height that is less than said first height.

5. The trash receptacle assembly according to claim 4, wherein said second height is between seventy percent and ninety percent of said first height.

6. A trash receptacle assembly comprising, a first section having an incomplete peripheral wall with a top edge, a first side edge and a second side edge, wherein a gap is disposed in said top edge of said incomplete peripheral wall between said first side edge and said second side edge;

guide tracks formed along at least part of said first side edge and at least part of said second side edge;

a peripheral wall segment with a third side edge, a fourth side edge, and a wall band that extends from said third side edge to said fourth side edge, wherein said wall band has a lower edge, wherein said peripheral wall segment is shaped and sized to fill said gap in said incomplete peripheral wall with said lower edge of said wall band contacting and covering said top edge of said incomplete peripheral wall, wherein said peripheral wall segment is completely separate and distinct from said first section, and wherein said peripheral wall segment can selectively slide into said guide tracks therein filling said gap in said incomplete peripheral wall with said peripheral wall segment.

7. The trash receptacle assembly according to claim 6, wherein said lower edge of said band and said top edge of said incomplete peripheral wall follow contoured paths with peaks and troughs at points along said paths that interlock when said peripheral wall segment is in said guide tracks and fills said gap.

8. The trash receptacle assembly according to claim 6, wherein said trash receptacle assembly has a first height and said incomplete peripheral wall has a second height that is less than said first height.

9. The trash receptacle assembly according to claim 8, wherein said second height is between seventy percent and ninety percent of said first height.

10. A method of forming a trash receptacle, comprising:

providing a receptacle section having an incomplete peripheral wall, said incomplete peripheral wall having a top edge, a first side edge, a second side edge, and a gap defined between said first side edge and said second side edge, wherein guide tracks are disposed along at least part of said first side edge and at least part of said second side edge;

providing a peripheral wall segment with a third side edge, a fourth side edge, and a wall band that extends from said third side edge to said fourth side edge, wherein said wall band has a lower edge, wherein said peripheral wall segment is shaped and sized to fill said gap in said incomplete peripheral wall, wherein said second section is completely separate and distinct from said receptacle section, and wherein said peripheral wall segment is shaped and sized to fill said gap in said incomplete peripheral wall, sliding said peripheral wall segment into said guide tracks to connect said peripheral wall segment to said receptacle section and to close said gap in said incomplete peripheral wall, wherein said lower edge of said peripheral wall segment contacts and covers said top edge of said incomplete peripheral wall.

11. The trash receptacle method according to claim 10, further including latching said peripheral wall segment to said receptacle section when said peripheral wall segment is positioned in said gap in said incomplete peripheral wall.

* * * * *